United States Patent
Chang et al.

(10) Patent No.: US 9,153,263 B1
(45) Date of Patent: Oct. 6, 2015

(54) DISK DRIVE DETECTING MINI WEDGE BY EVALUATING WEDGE ID OF SERVO SECTOR

(71) Applicant: Western Digital Technologies, Inc., Irvine, CA (US)

(72) Inventors: Michael Chang, San Jose, CA (US); Wei Guo, Fremont, CA (US); Russ A. Quisenberry, San Jose, CA (US); Guoxiao Guo, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/152,737

(22) Filed: Jan. 10, 2014

Related U.S. Application Data

(60) Provisional application No. 61/917,875, filed on Dec. 18, 2013.

(51) Int. Cl.
  *G11B 5/596* (2006.01)
  *G11B 20/12* (2006.01)
  *G11B 20/10* (2006.01)

(52) U.S. Cl.
  CPC .. *G11B 5/59633* (2013.01); *G11B 2020/10916* (2013.01); *G11B 2020/1267* (2013.01)

(58) Field of Classification Search
  None
  See application file for complete search history.

(56) References Cited

U.S. PATENT DOCUMENTS

| | | | |
|---|---|---|---|
| 6,118,603 A * | 9/2000 | Wilson et al. | 360/48 |
| 6,934,114 B1 * | 8/2005 | Codilian et al. | 360/77.08 |
| 7,046,465 B1 | 5/2006 | Kupferman | |
| 7,110,208 B1 | 9/2006 | Miyamura et al. | |
| 7,724,464 B2 | 5/2010 | Kisaka et al. | |
| 8,760,794 B1 * | 6/2014 | Coker et al. | 360/77.08 |
| 8,767,341 B1 * | 7/2014 | Coker et al. | 360/77.08 |
| 2003/0035239 A1 * | 2/2003 | Ottesen et al. | 360/78.06 |
| 2003/0039047 A1 * | 2/2003 | Ottesen et al. | 360/48 |

* cited by examiner

*Primary Examiner* — Daniell L Negron

(57) ABSTRACT

A disk drive is disclosed comprising a head actuated over a disk comprising a plurality of tracks defined by servo sectors forming a plurality of full wedges and a plurality of mini wedges. The wedge ID field of a servo sector forming one of the full wedges is offset from a beginning of a sync mark by a first offset, and the wedge ID field of a servo sector forming one of the mini wedges is offset from the beginning of the sync mark by a second offset equal to the first offset. A first servo sector is read from the disk to generate a read signal, the read signal is demodulated to detect the wedge ID of the first servo sector, and the detected wedge ID is evaluated to determine whether the first servo sector forms one of the mini wedges.

14 Claims, 5 Drawing Sheets

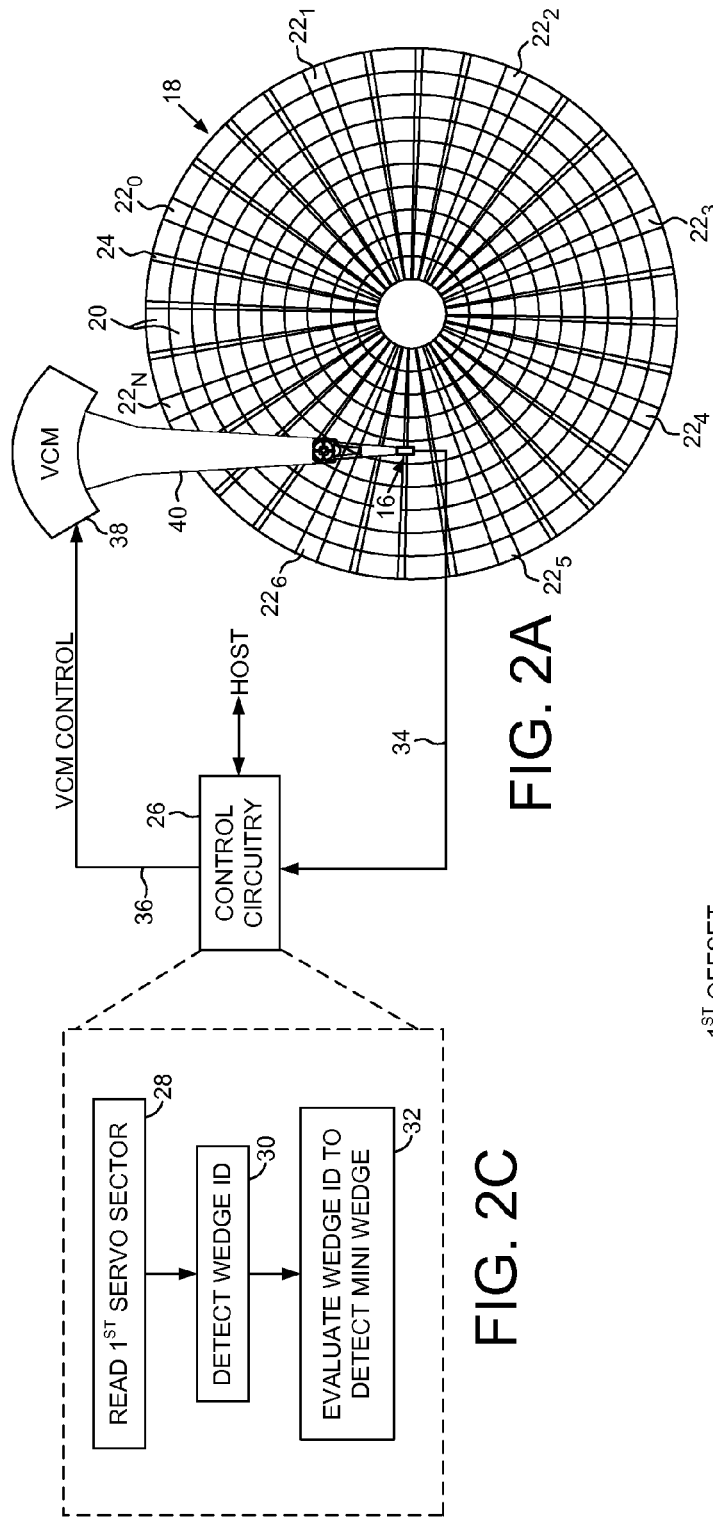
FIG. 2A
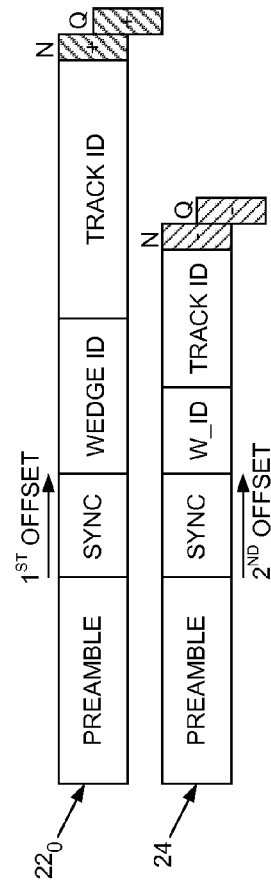
FIG. 2B
FIG. 2C

| SECTOR TYPE | WRITTEN W_ID | WEDGE ID |
|---|---|---|
| FULL | 256 | 256 |
| MINI | 3 (11) | 257 |
| MINI | 3 (11) | 258 |
| MINI | 3 (11) | 259 |
| FULL | 260 | 260 |
| MINI | 3 (11) | 261 |
| MINI | 3 (11) | 262 |
| MINI | 3 (11) | 263 |
| FULL | 264 | 264 |
| MINI | 3 (11) | 265 |
| MINI | 3 (11) | 266 |
| MINI | 3 (11) | 267 |

US 9,153,263 B1

DISK DRIVE DETECTING MINI WEDGE BY EVALUATING WEDGE ID OF SERVO SECTOR

CROSS REFERENCE TO RELATED APPLICATION(S)

This application claims the benefit of U.S. Provisional Application No. 61/917,875, filed on Dec. 18, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6i further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a disk drive according to an embodiment comprising a head actuated over a disk comprising a plurality of tracks defined by servo sectors forming a plurality of full wedges and a plurality of mini wedges.

FIG. 2B shows an embodiment wherein the wedge ID field of a servo sector forming one of the full wedges is offset from the beginning of a sync mark by a first offset, and the wedge ID field of a servo sector forming one of the mini wedges is offset from the beginning of the sync mark by a second offset equal to the first offset.

FIG. 2C is a flow diagram according to an embodiment wherein a first servo sector is read from the disk to generate a read signal, the read signal is demodulated to detect the wedge ID of the first servo sector, and the detected wedge ID is evaluated to determine whether the first servo sector forms one of the mini wedges.

DETAILED DESCRIPTION

Figure 1:
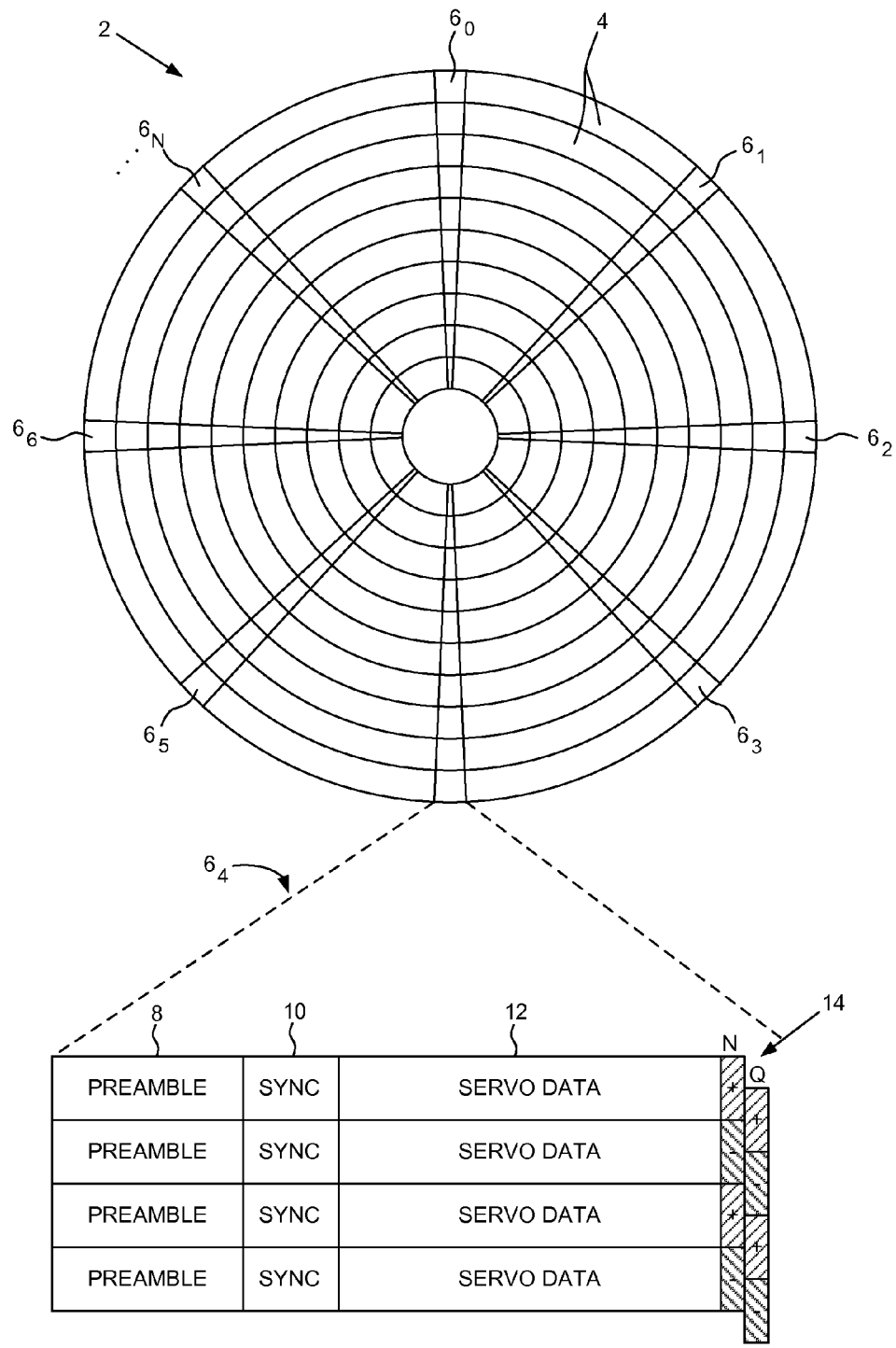
FIG. 1 shows a prior art disk format comprising a plurality of servo tracks defined by servo sectors.

FIG. 2A shows a disk drive according to an embodiment comprising a head 16 actuated over a disk 18 comprising a plurality of tracks 20 defined by servo sectors forming a plurality of full wedges $22_0$-$22_N$ and a plurality of mini wedges (e.g., mini-wedge 24). Each servo sector comprises a sync mark and a wedge ID field for storing a wedge ID identifying one of the wedges (FIG. 2B). The wedge ID field of a servo sector forming one of the full wedges is longer than the wedge ID field of a servo sector forming one of the mini wedges. As illustrated in FIG. 2B, the wedge ID field of a servo sector forming one of the full wedges is offset from a beginning of the sync mark by a first offset, and the wedge ID field (W_ID) of a servo sector forming one of the mini wedges is offset from the beginning of the sync mark by a second offset equal to the first offset. The disk drive further comprises control circuitry 26 configured to execute the flow diagram of FIG. 2C, wherein a first servo sector is read from the disk to generate a read signal (block 28), the read signal is demodulated to detect the wedge ID of the first servo sector (block 30), and the detected wedge ID is evaluated to determine whether the first servo sector forms one of the mini wedges (block 32).

In the embodiment of FIG. 2A, the control circuitry 26 processes the read signal 34 emanating from the head 16 to demodulate the servo sectors and generate a position error signal (PES) representing an error between the actual position of the head and a target position relative to a target track. The control circuitry 26 filters the PES using a suitable compensation filter to generate a control signal 36 applied to a voice coil motor (VCM) 38 which rotates an actuator arm 40 about a pivot in order to actuate the head 16 radially over the disk 18 in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (as shown in FIG. 2B).

In the embodiment of FIG. 2A, there are multiple mini wedges between each full wedge which increases the servo sample frequency, thereby improving performance of the servo control system. In order to reduce the amount of recordable area consumed by the mini wedges, in one embodiment the wedge ID field (W_ID) of a mini wedge is substantially shorter than the wedge ID field of a full wedge as shown in FIG. 2B. Also in one embodiment the track ID field of a mini wedge may be substantially shorter than the track ID field of a full servo wedge (e.g., the track ID field of a mini wedge may store a number of the least significant bits of a full track ID). In one embodiment, the wedge ID is recorded in a full wedge and in a mini wedge so that the wedge ID may be used to determine whether the current servo sector being read is a full wedge or a mini wedge. To facilitate this dual function of the wedge ID, the wedge ID for a full wedge and for a mini wedge are recorded with the same offset relative to the beginning of the sync mark in a servo sector as illustrated in FIG. 2B. In the example of FIG. 2B, the wedge ID is recorded following the sync mark, but there may be other fields between the sync mark and the wedge ID field.

By recording the wedge ID field with the same offset from the beginning of the sync mark for both a full wedge and a mini wedge, when the head reads a mini wedge the wedge ID field may be demodulated as if it were in a full wedge. That is, the demodulated wedge ID would include the bits of the mini wedge ID (W_ID) plus a number of bits that extend into the track ID field in the example of FIG. 2B. In one embodiment the wedge ID field is recorded so that if a mini wedge is being read, the wedge ID will demodulate into a value that correctly identifies a mini wedge rather than a full wedge.

Figures 3A, 3B:
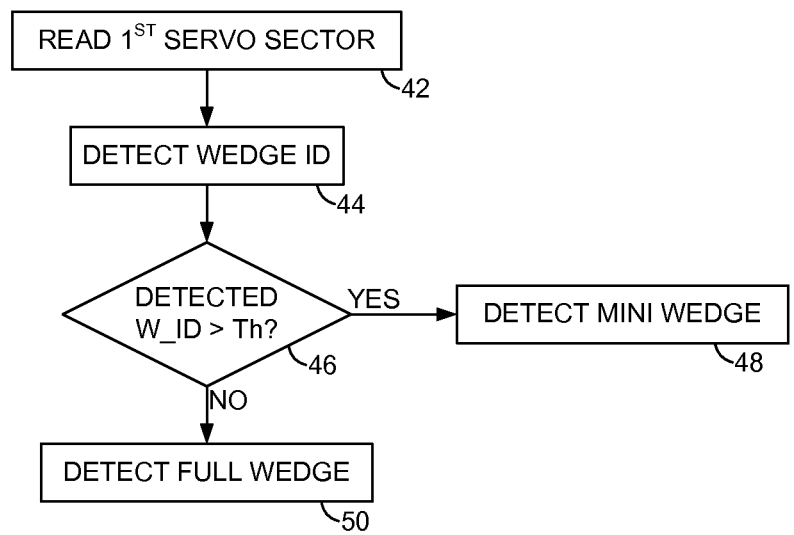
FIGS. 3A and 3B illustrate an embodiment wherein a mini wedge is detected when the detected wedge ID exceeds a threshold.

An example embodiment of recording the wedge ID in a manner that distinguishes a full wedge from a mini wedge is illustrated in the partial wedge ID table shown in FIG. 3A. In this example, the wedge ID of servo sector in a full wedge comprises 9 bits which is used to encode the wedge ID for 296 wedges (0 to 295), where the maximum wedge number of 295 is represented as the binary number '100100111'. That is, the two most significant bits of the wedge ID for a full wedge will never comprise '11'. Therefore, in this embodiment the wedge ID field of a mini wedge comprises two bits recorded with the binary number '11'. In this manner when the wedge ID field of a mini wedge is demodulated as if it were a full wedge (e.g., by demodulating the 2 bit W_ID field and 7 bits of the track ID field in the mini wedge of FIG. 2B), the resulting wedge ID will be greater than 295. So if an error causes the servo control system to lose track of the current servo sector which then attempts to read a mini wedge as if it were a full wedge (or vise versa), the detected wedge ID may be evaluated to verify whether the current servo sector is a full wedge or a mini wedge.

The embodiment of FIG. 3A is further explained by the flow diagram of FIG. 3B wherein when a servo sector is read (block 42), the wedge ID is demodulated as if the servo sector was in a full wedge (block 44). If the detected wedge ID is greater than a threshold (block 46) (e.g., greater than 295 in the above example), then the servo sector is determined to be in a mini wedge (block 48), otherwise the servo sector is determined to be in a full wedge (block 50).

Figures 4A, 4B:
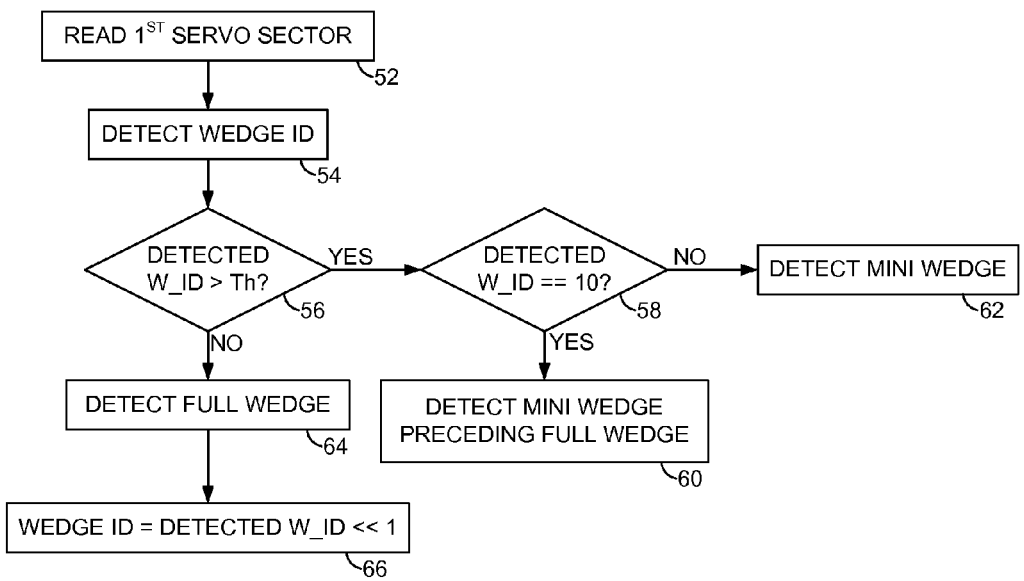
FIGS. 4A and 4B illustrate an embodiment wherein when a mini wedge is detected the detected wedge ID is evaluated to determine whether the servo sector precedes a full wedge.

Another example embodiment of recording the wedge ID in a manner that distinguishes a full wedge from a mini wedge is illustrated in the partial wedge ID table shown in FIG. 4A. In this example, the wedge ID of servo sector in a full wedge comprises 9 bits which is used to encode the wedge ID for 296 wedges (0 to 295), where the maximum wedge number of 295 is represented as the binary number '100100111'. However, before writing each wedge ID to a servo sector of a full wedge, the wedge ID is shifted right by one bit so that the maximum wedge number becomes 147 which is represented as the binary number '010010011'. That is, the two most significant bits of the recorded wedge ID for a full wedge will never comprise '10' or '11'. Therefore, in this embodiment the wedge ID field of a mini wedge comprises two bits recorded with the binary number '11' or with the binary number '10'. In this manner when the wedge ID field of a mini wedge is demodulated as if it were a full wedge (e.g., by demodulating the 2 bit W_ID field and 7 bits of the track ID field in the mini wedge of FIG. 2B), the resulting wedge ID will be greater than 147. So if an error causes the servo control system to lose track of the current servo sector which then attempts to read a mini wedge as if it were a full wedge (or vise versa), the detected wedge ID may be evaluated to verify whether the current servo sector is a full wedge or a mini wedge. In addition, in one embodiment the wedge ID field of a mini wedge may be recorded with the binary number '10' if the mini wedge precedes a full wedge, otherwise the wedge ID may be recorded with the binary number '11' (or vise versa) as illustrated in FIG. 4A. In this manner, the servo control system may detect when the next servo sector will be in a full wedge and therefore preconfigure the control circuitry to demodulate a full wedge servo sector when reading the next servo sector.

The embodiment of FIG. 4A is further explained by the flow diagram of FIG. 4B wherein when a servo sector is read (block 52), the wedge ID is demodulated as if the servo sector was in a full wedge (block 54). If the detected wedge ID is greater than a threshold (block 56) (e.g., greater than 147 in the above example), then the servo sector is determined to be in a mini wedge. Therefore if the two most significant bits of the detected wedge ID equals '10' (block 58), the servo sector is determined to be in a mini wedge that precedes a full wedge (block 60), otherwise the servo sector is determined to be in another one of the mini wedges (block 62). If the detected wedge ID is not greater than the threshold at block 56, then the servo sector is determined to be in a full wedge (block 64). The detected wedge ID of the full wedge is therefore shifted left by one bit (block 66) to generate the actual wedge ID for the full wedge.

Figures 5A, 5B:
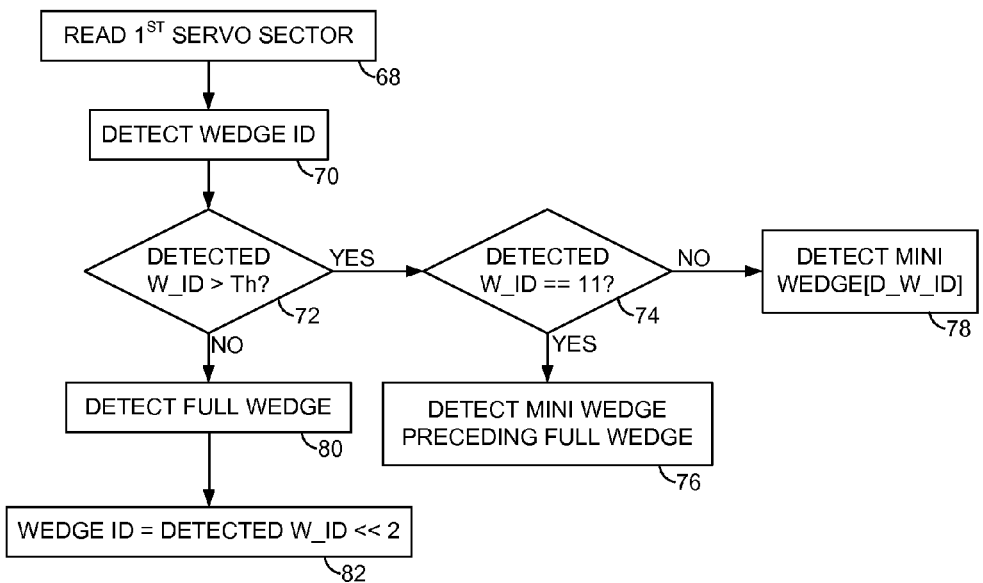
FIGS. 5A and 5B illustrate an embodiment wherein the wedge ID in a servo sector of a full wedge is shifted right by two bits when recorded so that the wedge ID of a servo sector of a mini wedge may identify a sequence of mini wedges.

Another example embodiment of recording the wedge ID in a manner that distinguishes a full wedge from a mini wedge is illustrated in the partial wedge ID table shown in FIG. 5A. In this example, the wedge ID field of servo sector in a full wedge comprises 9 bits which is used to encode the wedge ID for 296 wedges (0 to 295), where the maximum wedge number of 295 is represented as the binary number '100100111'. However, before writing each wedge ID to a servo sector of a full wedge, the wedge ID is shifted right by two bits so that the maximum wedge number becomes 73 which is represented as the binary number '001001001'. That is, the two most significant bits of the recorded wedge ID for a full wedge will never comprise '01', '10', or '11'. Therefore, in this embodiment the wedge ID field of a mini wedge comprises two bits recorded with the binary number '01', '10', or '11'. In this manner when the wedge ID field of a mini wedge is demodulated as if it were a full wedge (e.g., by demodulating the 2 bit W_ID field and 7 bits of the track ID field in the mini wedge of FIG. 2B), the resulting wedge ID will be greater than 73. So if an error causes the servo control system to lose track of the current servo sector when then attempts to read a mini wedge as if it were a full wedge (or vise versa), the detected wedge ID may be evaluated to verify whether the current servo sector is a full wedge or a mini wedge. In addition, in one embodiment the wedge ID field of a mini wedge may be recorded with a binary number that identifies a sequence of the mini wedges as illustrated in FIG. 5A. In this manner, the servo control system may detect when the next servo sector will be in a full wedge and therefore preconfigure the control circuitry to demodulate a full wedge servo sector when reading the next servo sector. In addition, the servo control system may determine the current mini wedge in a sequence of mini wedges; for example, when the current mini wedge is the first, second, or third mini wedge in a sequence of three mini wedges.

The embodiment of FIG. 5A is further explained by the flow diagram of FIG. 5B wherein when a servo sector is read (block 68), the wedge ID is demodulated as if the servo sector was in a full wedge (block 70). If the detected wedge ID is greater than a threshold (block 72) (e.g., greater than 73 in the above example), then the servo sector is determined to be in a mini wedge. Therefore if the two most significant bits of the detected wedge ID equals '11' (block 74), the servo sector is determined to be in a mini wedge that precedes a full wedge (block 76), otherwise the servo sector is determined to be another one of a sequence of mini wedges (block 78). If the detected wedge ID is not greater than the threshold at block 72, then the servo sector is determined to be in a full wedge (block 80). The detected wedge ID of the full wedge is therefore shifted left by two bits (block 82) to generate the actual wedge ID for the full wedge.

Although the example embodiments described above encode the wedge ID using 9 bits, the wedge ID may be encoded using any suitable number of bits in order to encode any suitable number of wedges. In addition, the wedge ID of a servo sector in a mini wedge may represent any suitable number of most significant bits of the recorded wedge ID. For example, the wedge ID of a mini wedge servo sector may comprise a single bit or more than the two bits described in the above embodiments. In addition, there may be more or less than three mini wedges between each full wedge as in the above described embodiments. In the embodiments described above where the wedge ID may be shifted right before recording the wedge ID on the disk, the wedge ID may be shifted right any suitable number of times. Still further, the binary bits of the wedge ID recorded in a servo sector of a mini wedge may be encoded in any suitable manner in order to represent any suitable aspect of a mini wedge, such as a mini wedge that precedes a full wedge or a sequence of mini wedges.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple tasks or events may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
 a disk comprising a plurality of tracks defined by servo sectors forming a plurality of full wedges and a plurality of mini wedges, wherein:
  each servo sector comprises a sync mark and a wedge ID field for storing a wedge ID identifying one of the wedges;
  the wedge ID field of a servo sector forming one of the full wedges is longer than the wedge ID field of a servo sector forming one of the mini wedges;
  the wedge ID field of a servo sector forming one of the full wedges is offset from a beginning of the sync mark by a first offset; and
  the wedge ID field of a servo sector forming one of the mini wedges is offset from the beginning of the sync mark by a second offset equal to the first offset;
 a head actuated over the disk; and
 control circuitry configured to:
  read a first servo sector from the disk to generate a read signal;
  demodulate the read signal to detect the wedge ID of the first servo sector; and
  evaluate the detected wedge ID to determine whether the first servo sector forms one of the mini wedges.

2. The disk drive as recited in claim 1, wherein the control circuitry is further configured to determine whether the first servo sector forms one of the mini wedges by evaluating at least one high order bit of the detected wedge ID.

3. The disk drive as recited in claim 1, wherein the control circuitry is further configured to determine whether the first servo sector forms one of the mini wedges when the detected wedge ID exceeds a threshold.

4. The disk drive as recited in claim 1, wherein the control circuitry is further configured to evaluate the detected wedge ID to determine whether the first servo sector forms one of the mini wedges that precedes one of the full wedges.

5. The disk drive as recited in claim 4, wherein there are M mini wedges between consecutive full wedges and the control circuitry is further configured to evaluate the detected wedge ID to determine a position of the first servo sector within the M mini wedges.

6. The disk drive as recited in claim 5, wherein when the first servo sector is determined to form one of the full wedges, the control circuitry is further configured to shift the detected wedge ID left at least once to identify the full wedge.

7. The disk drive as recited in claim 1, wherein when the first servo sector is determined to form one of the full wedges, the control circuitry is further configured to shift the detected wedge ID left at least once to identify the full wedge.

8. A method of operating a disk drive, the disk drive comprising a head actuated over a disk comprising a plurality of tracks defined by servo sectors forming a plurality of full wedges and a plurality of mini wedges, wherein:
- each servo sector comprises a sync mark and a wedge ID field for storing a wedge ID identifying one of the wedges;
- the wedge ID field of a servo sector forming one of the full wedges is longer than the wedge ID field of a servo sector forming one of the mini wedges;
- the wedge ID field of a servo sector forming one of the full wedges is offset from a beginning of the sync mark by a first offset; and
- the wedge ID field of a servo sector forming one of the mini wedges is offset from the beginning of the sync mark by a second offset equal to the first offset;

the method comprising:
- reading a first servo sector from the disk to generate a read signal;
- demodulating the read signal to detect the wedge ID of the first servo sector; and
- evaluating the detected wedge ID to determine whether the first servo sector forms one of the mini wedges.

9. The method as recited in claim 8, further comprising determining whether the first servo sector forms one of the mini wedges by evaluating at least one high order bit of the detected wedge ID.

10. The method as recited in claim 8, further comprising determining whether the first servo sector forms one of the mini wedges when the detected wedge ID exceeds a threshold.

11. The method as recited in claim 8, further comprising evaluating the detected wedge ID to determine whether the first servo sector forms one of the mini wedges that precedes one of the full wedges.

12. The method as recited in claim 11, wherein there are M mini wedges between consecutive full wedges and the method further comprises evaluating the detected wedge ID to determine a position of the first servo sector within the M mini wedges.

13. The method as recited in claim 12, wherein when the first servo sector is determined to form one of the full wedges, the method further comprises shifting the detected wedge ID left at least once to identify the full wedge.

14. The method as recited in claim 8, wherein when the first servo sector is determined to form one of the full wedges, the method further comprises shifting the detected wedge ID left at least once to identify the full wedge.

\* \* \* \* \*